United States Patent [19]

Niggermann

[11] Patent Number: 4,825,899
[45] Date of Patent: May 2, 1989

[54] FLUID MONITORING AND CONTROL SYSTEM FOR INTEGRATED DRIVE GENERATORS OR THE LIKE

[75] Inventor: Richard E. Niggermann, Rockford, Ill.

[73] Assignee: Sundstrand Corporation, Rockford, Ill.

[21] Appl. No.: 944,928

[22] Filed: Dec. 22, 1986

[51] Int. Cl.$^4$ .............................................. F16K 49/00
[52] U.S. Cl. ...................................... 137/334; 74/467; 74/687; 137/899.2; 184/6.4
[58] Field of Search .............. 184/6.4, 31, 108, 103.1; 137/334, 554, 899.2; 74/467, 606 A

[56] References Cited

U.S. PATENT DOCUMENTS

| | | | |
|---|---|---|---|
| 2,751,044 | 6/1956 | Harris | 184/6.4 |
| 3,146,629 | 9/1964 | Schmitter | 74/467 |
| 3,365,981 | 1/1968 | Gantzer | 74/687 |
| 3,497,034 | 2/1970 | Eddy Jr. | 184/6.4 |
| 3,658,153 | 4/1972 | Berman | 184/6.4 |
| 3,947,836 | 3/1976 | Smith et al. | 184/6.4 |
| 4,252,035 | 2/1981 | Gardner et al. | 74/687 |
| 4,445,592 | 5/1984 | New et al. | 184/31 |

Primary Examiner—A. Michael Chambers
Attorney, Agent, or Firm—Wood, Dalton, Phillips, Mason & Rowe

[57] ABSTRACT

A fluid monitoring and control system for use with such electromechanical apparatus as integrated drive generators, or the like, which include a casing and a rotatable shaft extending into the casing. A rotatable chamber is connected to the shaft for rotation thereby and for converting the volume of liquid in the chamber into a centrifugal liquid pressure head in response to rotation of the chamber. A pump scavenges liquid from the casing and delivers the scavenged liquid to the rotatable chamber. An accumulator is hydraulically coupled to the rotatable chamber for receiving liquid therefrom when the liquid level reaches a predetermined maximum level. the accumulator supplies liquid therefrom to the casing, through the rotatable chamber, when the liquid level reaches a predetermined minimum level.

21 Claims, 2 Drawing Sheets

FLUID MONITORING AND CONTROL SYSTEM FOR INTEGRATED DRIVE GENERATORS OR THE LIKE

FIELD OF THE INVENTION

This invention generally relates to a fluid monitoring and control system for use with such electromechanical means as integrated drive generator, or the like.

BACKGROUND OF THE INVENTION

In the design of aircraft, it is desirable to operate the aircraft accessories with a constant frequency source of electric power. In some conventional systems, an integrated drive generator is used, powered by the aircraft engine. The generator or alternator provided for this purpose must therefore be driven at a constant speed. As aircraft engines usually have a wide speed range to accommodate the varying power requirements of take-off, landing and flight, a constant speed drive transmission driven by the engine and driving the generator or alternator must be provided to maintain a stable source of electric power for the aircraft's accessories. Various parameters are considered in designing such a constant speed transmission, such as the confined envelope or space into which the constant speed transmission is mounted between the engine and the generator or alternator, and the transmission must be capable of delivering considerable power to the alternator under varying environmental conditions and over a wide range of input speeds. Examples of such integrated drive generators are shown in U.S. Pat. Nos. 3,365,981 to Gantzer, dated Jan. 30, 1968, and 4,252,035 to Cordner et al, dated Feb. 24, 1981, both assigned to the assignee of the instant invention.

Such integrated drive generators as described above include a casing with an input shaft extending into the casing to drive the components of the generator. Coolant or oil is used for cooling and lubricating the various components of the generator. One of the major problems with integrated drive generator systems of the character described above, is the maintenance of a desired level of oil or coolant in the system. Normally, oil flows through the entire aircraft engine system, including the integrated drive generator, and it often is difficult to monitor and control the oil level. Oil from other portions of the system can even drain into the integrated drive generator, or the generator casing itself may become "starved" while other areas of the system have adequate or more than adequate oil or coolant. It is important to maintain a proper level of oil in the integrated drive generator in order to prevent the oil from migrating into the generator "gap" between the windings. In addition, it is desirable to maintain the oil level in the integrated drive generator as low as possible, while still maintaining adequate lubrication and cooling, because any build-up of the oil level may interfere with the high speed operation of the generator parts. Furthermore, the monitoring and control system must be substantially immune to attitudes and "G-levels" of the aircraft during maneuvers. Therefore, the invention is directed to a fluid or oil/coolant monitoring and control system located in the integrated drive generator where an appropriate casing and other moving part can provide an excellent monitoring station, whereas other components or areas of the aircraft system may only have coolant flow therethrough.

This invention is directed to an improved air/oil management system incorporated directly into the integrated drive generator system used in an aircraft electrical generating arrangement.

SUMMARY OF THE INVENTION

An object, therefore, of the invention is to provide a new and improved fluid monitoring and control system for managing the air/oil level in an integrated drive generator for aircraft electrical generating systems or other such electromotive systems.

In the exemplary embodiment of the invention, the air/oil management system generally includes means for converting the liquid level in a casing into a liquid pressure component proportional to the liquid level. Accumulator means are hydraulically coupled to the converting means for receiving liquid therefrom when the liquid reaches a predetermined maximum level. Means are provided operatively associated with the accumulator means for supplying liquid therefrom to the casing when the liquid level reaches a predetermined minimum level. Preferably, the converting means is connected to the rotatable shaft means of the integrated drive generator, for instance, for operation thereby.

More particularly, the means for converting the liquid level into a liquid pressure component is illustrated in the form of a rotatable drum forming a chamber for receiving liquid from the casing of the generator. The volume of liquid in the chamber is converted into a centrifugal liquid pressure head in response to rotation of the chamber by the generator shaft. The accumulator is hydraulically coupled to the rotatable chamber by a conduit or tube having an inlet at a predetermined location radially outwardly of the axis of rotation of the chamber. Therefore, excess liquid or oil in the generator casing is channeled to the accumulator as long as the tube is covered by the rotating mass of oil. When the oil or liquid level reaches a predetermined minimum level, as determined by the inlet to the tube, oil returns from the accumulator back into the generator casing.

Preferably, the accumulator includes an expandable chamber and biasing means acting on the expandable chamber for automatically supplying liquid back to the casing when the liquid level reaches the predetermined minimum level.

Other features of the invention include deaerating means in the rotatable chamber for removing gases from the oil. Conduit means communicate with the interior of the rotatable chamber near the radial outer extremities thereof for returning deaerated fluid back to the casing. In addition, transducer means may be employed in operative association with the expandable chamber of the accumulator to provide an output signal as to the level of oil in the integrated drive generator.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
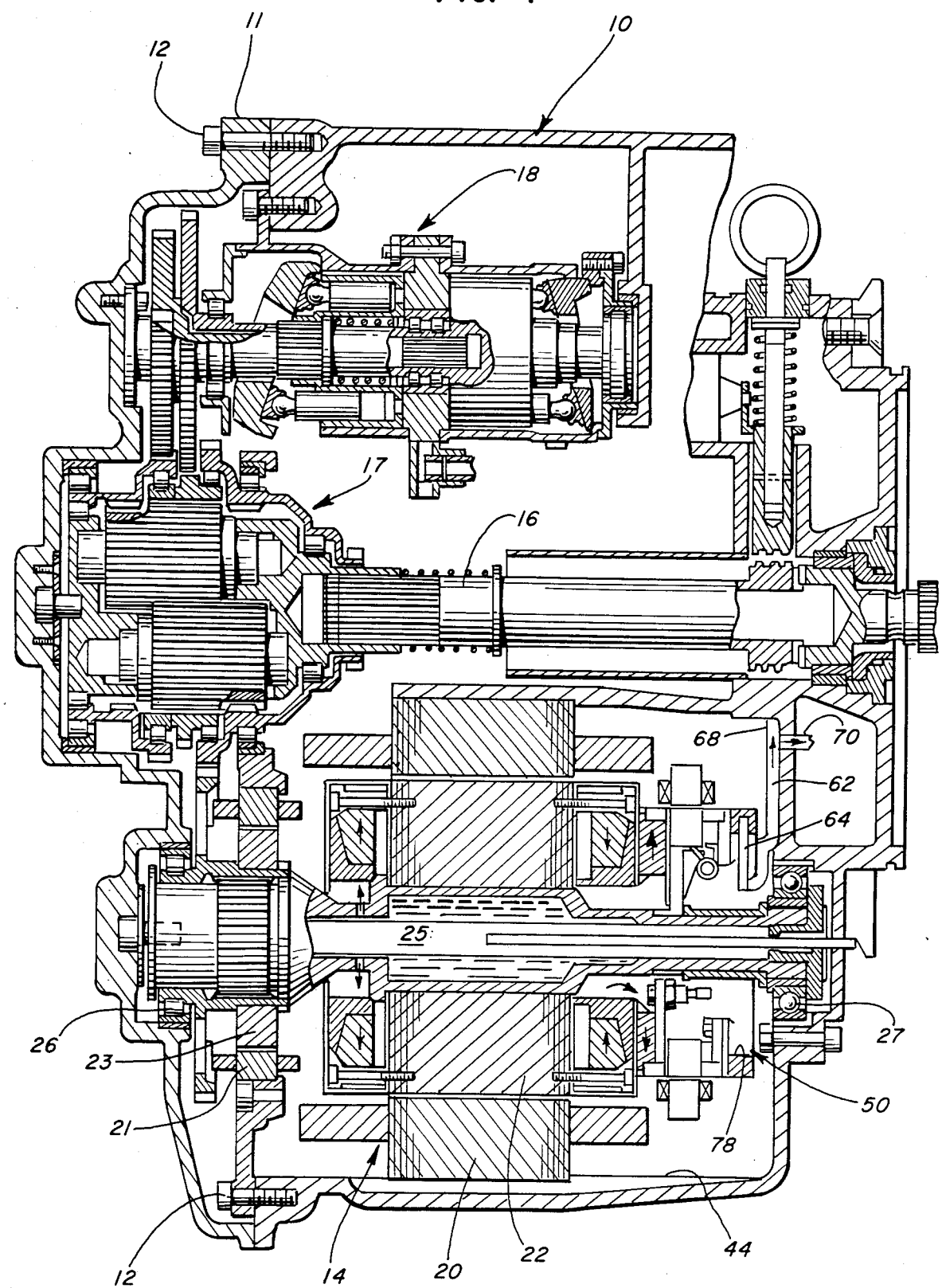
FIG. 1 is a plan section of an integrated drive generator system, incorporating the fluid monitoring and control system of this invention.

Referring to the drawings in greater detail, and first to FIG. 1, an integrated drive generator system is generally designated 10 and is of the type which is illustrated in the aforementioned U.S. Pat. No. 4,252,035. That patent is incorporated herein by reference as to the more detailed components of the generator. However, suffice it to say, integrated drive generator 10 includes a housing or casing, generally designated 10, with an enclosing top cover 11 secured thereto, as by a series of fastening devices 12. Components of the system include an electrical generator, generally designated 14, which is to be operated at a constant speed by means of a drive applied to a drive input shaft 16. The drive does not go directly to the generator, since the speed of input shaft 16 may vary, dependent upon the speed of the prime mover, such as an aircraft engine to which the system is connected.

The system further includes a mechanical differential, generally designated 17, and a variable speed transmission, generally designated 18 and which preferably is in the form of a hydrostatic transmission.

Generator 14 has a pair of stators 20 and 21 associated with a pair of rotors 22 and 23, respectively, and which have electrical windings associated therewith. Rotors 22 and 23 are mounted on a shaft 25 which has a pair of bearings 26 and 27 positioned at opposite ends thereof and supported within housing 10 whereby the rotors are mounted for rotation relative to the stators. It is in this area of housing 10 that the fluid monitoring and control system of this invention is incorporated. Other details of the integrated drive generator shown in FIG. 1 can be derived from the U.S. Pat. No. 4,252,035 patent which is incorporated herein by reference.

The invention is best understood with reference to the schematic illustration of FIG. 2 which shows housing or casing 10, generator 15 and shaft 25, and which should be referenced hereinafter in conjunction with the more detailed generator depiction of FIG. 1.

More particularly, the fluid monitoring and control system of this invention generally includes converting means, generally designated 28, for converting the liquid level in casing 10 into a liquid pressure component proportional to the liquid level; accumulator means, generally designated 30, hydraulically coupled to converting means 28 for receiving liquid therefrom when the liquid level reaches a predetermined maximum level; and means, generally designated 32, operatively associated with accumulator 30 for supplying liquid therefrom back to casing 10, through converting means 28, when the liquid level reaches a predetermined minimum level. An air/oil mixture or fluid is supplied to casing 10 through appropriate inlet means 33 for cooling and lubricating the operative components of the generator within the casing.

More particularly, accumulator means 30 includes an accumulator chamber 34 for containing a volume of liquid 36. Chamber 34 is made expandable, by expansion means 38 backed by biasing means in the form of a coil spring 40 which effectively acts upon the volume of liquid 36 in the accumulator chamber. The accumulator is coupled to converting means 28 by a conduit 42, for purposes described hereinafter.

A liquid level 44 is shown in casing 10 to be the level of lubricating and cooling oil which the invention is designed to monitor. A scavenge pump 46 delivers the oil through a conduit 48 to converting means 28. As stated above, converting means 28 is effective to convert the liquid level in casing 10 into a liquid pressure component proportional to the liquid level and, when the liquid level is at a predetermined maximum level, delivering the liquid to accumulator 30. When the liquid level reaches a predetermined minimum level, the liquid in accumulator 30 will be supplied back to the casing automatically as spring 40 acts upon the volume of liquid 36 in accumulator chamber 34.

Converting means 28 comprises a drum, generally designated 50, which includes a closed side wall 52, an open side wall 54 having a central opening 56, and a cylindrical outer wall 58. The drum is fixed to shaft 25 for rotation therewith as the drum defines a rotatable chamber for receiving liquid from casing 10, by means of scavenge pump 46 and conduit means 48 which delivers the liquid (air/oil mixture) into the rotating chamber through central opening 56 and end wall 54.

Deaerating means are provided in rotating drum or chamber 50 for removing gases or air from the air/oil mixture delivered through conduit 48. More particularly, a demister screen pack 60 covers the interior of side wall 52 of the rotating chamber. The air/oil mixture from conduit 48 impinges upon and penetrates the demister screen pack to facilitate deaerating the air/oil mixture. The heavier oil moves to the outside of the rotating chamber under centrifugal force. The lighter air migrates back to casing 10 through central opening 56 in side wall 54 of the chamber.

A second conduit 62 extends through central opening 56 in end wall 54 of rotating chamber 50 and has a radially outwardly extending portion 64 terminating in an open inlet 66 located near the radial outer extremities of the rotating drum. As the drum rotates, the deaerated oil moves under centrifugal force radially outwardly and enters inlet 66 to conduit 62 whereupon the deaerated oil is forced outwardly from the rotating drum back into the system. As shown in FIG. 2, conduit 62 has two outlet branches 68 and 70. Branch 68 may appropriately deliver the deaerated oil to an oil cooler of the system, and branch 70 may deliver the deaerated oil back to the charge pump of the system. The charge pump and oil cooler are conventional components of the overall aircraft fluid system. It should be understood that a completely self-contained system may be employed whereupon the deaerated oil would flow directly back into casing 10. In such an event, separate outlet means would be provided should the casing become overly flooded with oil.

Conduit 42, which hydraulically couples accumulator means 30 with converting means 28, includes a portion 72 projecting through central opening 56 inside wall 54 of rotating chamber 50. A radially outwardly extending leg portion 74 of the conduit means forms a level control tube of the invention. In essence, the level control tube comprises sensing means for the system. More particularly, reference "h" represents a range, as indicated by arrows 76, defining the predetermined maximum and minimum levels 78 and 80, respectively, within which the system operates. Minimum level 80, of course, is defined by the open end of level control tube 74. Maximum level 78 is determined by the spring rate of biasing means 40 in accumulator means 30. Therefore, when the mass of oil accumulating in rotating chamber 50 reaches maximum level 78, the oil, under the influence of centrifugal force, will flow through conduit 42 and into accumulator chamber 34 against the biasing of spring 40. This maintains a proper level of lubricating and cooling oil within the generator. Should the rotating mass of oil within chamber 50 reach the minimum level 80 defined by the open end of level control tube 74, oil automatically will be fed back from the accumulator to the casing, through rotating chamber 50. In other words, if a condition exists wherein there is less inflow of oil into casing 10 to cause level "h" to lower to the minimum level indicated at 80, accumulator means 30 will supply oil back into the system. If a condition exists where there is less outflow from casing 10 than inflow, level "h" will increase to the predetermined maximum level 78 whereby the oil is forced into the accumulator. In essence, the accumulator controls the level by taking up excess oil from the generator and putting back accumulated oil into the generator.

From the foregoing, it can be appreciated that the fluid monitoring and control or management system of the invention is immune to attitudes and "G-levels" of the aircraft during aircraft maneuvers. This is because the "G-levels" caused by centrifugal force acting on the rotating mass of oil within rotating chamber 50 is in the thousands compared to the "G-levels" on the aircraft itself and the interior components.

Figure 2:
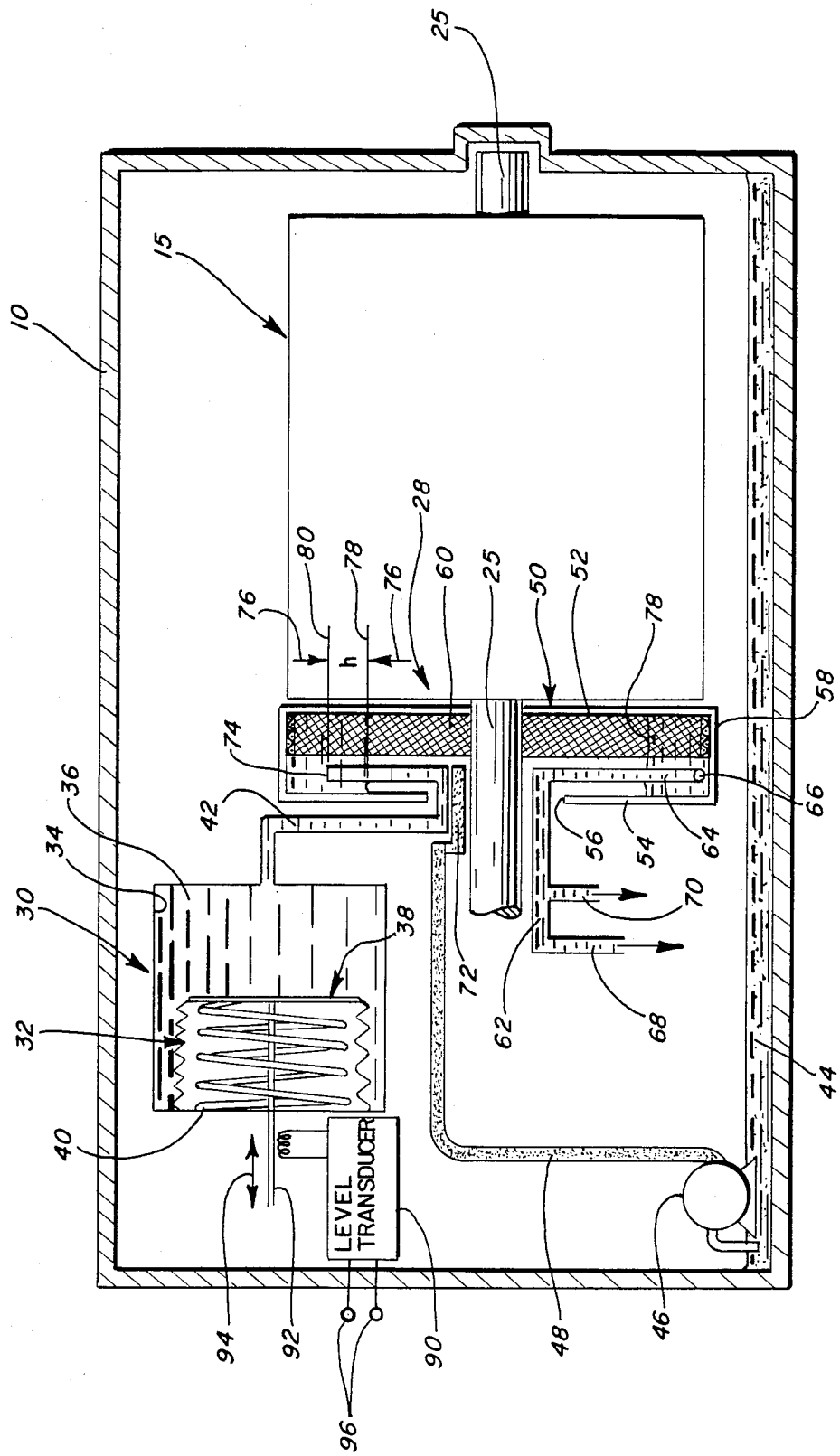
FIG. 2 is a somewhat schematic illustration of the fluid monitoring and control system of the invention, isolated from the other components of the integrated drive generator.

Another feature of the invention is shown in FIG. 2 wherein a level transducer 90 may be incorporated with an armature rod 92 fixed for movement with collapsible accumulator chamber 38, as indicated by double-headed arrow 94. As the armature moves with the increase and decrease of the volume of oil 36 in the accumulator, an output signal, through lines 96, may be directed to a remote central control which, thereby, signals the level of oil in casing 10 of the integrated drive generator. This is an excellent location for monitoring the liquid level for the entire aircraft cooling system because the generator has a casing within which the oil can accumulate, versus the mere flow through of oil in other areas or locations of the system. Of course, the sensing means provided by level transducer 90 does not inhibit the normal action of accumulator 30 for managing the oil level within the integrated drive generator. It would be only under conditions of extreme oil levels or constant and regular low readings at level flight that oil might be supplied to the entire system as monitored in the integrated drive generator casing.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A fluid monitoring and control system incorporated directly within casing means of such electromotive means as integrated drive generators, or the like, which include rotatable shaft means extending into the casing means, comprising:

rotatable means for converting the liquid level in said casing means into a liquid pressure component proportional to said liquid level;

accumulator means hydraulically coupled to said converting means for receiving liquid therefrom under the influence of centrifugal force when the liquid level reaches a predetermined maximum level; and means operatively associated with the accumulator means for supplying liquid therefrom back to the casing means through the converting means when the liquid level reaches a predetermined minimum level.

2. The fluid monitoring and control system of claim 1 wherein said converting means are connected to said rotatable shaft means for operation thereby.

3. The fluid monitoring and control system of claim 1 wherein said means operatively associated with the accumulator means include biasing means acting on the volume of liquid in the accumulator means for automatically supplying liquid to the casing means through the converting means.

4. The fluid monitoring and control system of claim 3 wherein said accumulator means include expandable chamber means and said biasing means acts against the expandable chamber means.

5. The fluid monitoring and control system of claim 1 wherein said converting means include rotatable chamber means for receiving liquid from the casing means, the volume of liquid in the chamber means being converted into a centrifugal liquid pressure head in response to rotation of the chamber means, and the accumulator means being hydraulically coupled to the rotatable chamber means in the area of centrifugal accumulation of liquid therein.

6. The fluid monitoring and control system of claim 5, including pump means for scavenging liquid from said casing means and delivering the scavenged liquid to the rotatable chamber means.

7. The fluid monitoring and control system of claim 5 wherein said rotatable chamber means include deaerating means therewithin for removing gases from the liquid.

8. The fluid monitoring and control system of claim 7 wherein said deaerating means comprises demister screen means.

9. The fluid monitoring and control system of claim 7, including conduit means communicating with the interior of the rotatable chamber means near the radial outer extremities thereof for returning deaerated liquid back to the casing.

10. The fluid monitoring and control system of claim 5 wherein said rotatable chamber means are connected to said rotatable shaft means for rotation thereby.

11. The fluid monitoring and control system of claim 5 wherein the accumulator means are hydraulically coupled to the rotatable chamber means by conduit means having an inlet at a predetermined location radially outwardly of the axis of rotation of the chamber means.

12. A self-contained coolant monitoring and control system incorporated directly within casing means of such electromotive means as integrated drive generators, or the like, which include rotatable shaft means extending into the casing means, comprising:

rotatable chamber means connected to said rotatable shaft means for rotation thereby and for receiving coolant from said casing means, the volume of coolant in the chamber means being converted into a centrifugal coolant pressure head in response to rotation of the chamber means;

pump means for scavenging coolant from said casing means and delivering the scavenged coolant to the rotatable chamber means;

accumulator means hydraulically coupled to the rotatable chamber means in the area of centrifugal accumulation of coolant therein and for receiving coolant therefrom under the influence of centrifugal force when the coolant level reaches a predetermined maximum level; and means operatively associated with the accumulator means for supplying coolant therefrom back to the casing means through the rotatable chamber means when the coolant level reaches a predetermined minimum level.

13. The fluid monitoring and control system of claim 12 wherein said means operatively associated with the accumulator means include biasing means acting on the volume of coolant in the accumulator means for automatically supplying coolant to the casing means through the rotatable chamber means.

14. The fluid monitoring and control system of claim 13 wherein said accumulator means include expandable chamber means and said biasing means acts against the expandable chamber means.

15. The fluid monitoring and control system of claim 1 wherein said accumulator means include expandable chamber means, and including transducer means operatively associated with the expandable chamber means for rendering a signal proportionate to the volume of coolant in the accumulator means.

16. The fluid monitoring and control system of claim 12 wherein said rotatable chamber means include deaerating means therewithin for removing gases from the coolant.

17. The fluid monitoring and control system of claim 16 wherein said deaerating means comprises demister screen means.

18. The fluid monitoring and control system of claim 16, including conduit means communicating with the interior of the rotatable chamber means near the radial outer extremities thereof for returning deaerated coolant back to the casing.

19. The fluid monitoring and control system of claim 12 wherein the accumulator means are hydraulically coupled to the rotatable chamber means by conduit means having an inlet at a predetermined location radially outwardly of the axis of rotation of the chamber means.

20. A fluid monitoring a control system incorporated directly within casing means of such electromotive means as integrated drive generators, or the like, which include rotatable shaft means extending into the casing means, comprising:

chamber means connected to the rotatable shaft means for rotation thereby and for receiving liquid from said casing means, including a closed radially outward chamber portion wherein the volume of liquid in the chamber means is converted into a centrifugal liquid pressure head in response to rotation of the chamber means;

liquid level sensing means extending centrally into the chamber means and radiating outwardly of the axis of rotation of the chamber means for sensing the level of liquid therewithin;

means for supplying liquid from said casing means to the rotatable chamber means; and means for returning liquid back from said rotatable chamber means to the casing means.

21. The fluid monitoring and control system of claim 20, including deaerating means in said rotatable chamber means for removing gases from the liquid supplied to the chamber means.

* * * * *

UNITED STATES PATENT AND TRADEMARK OFFICE
CERTIFICATE OF CORRECTION

PATENT NO. : 4,825,899

DATED : May 2, 1989

INVENTOR(S) : Richard E. Niggemann

It is certified that error appears in the above-identified patent and that said Letters Patent is hereby corrected as shown below:

On the title page, Item (19), "Niggermann" should read -- Niggemann --.

Please change the name of the the inventor from "Richard E. Niggermann" to --Richard E. Niggemann--.

Signed and Sealed this

Ninth Day of October, 1990

Attest:

HARRY F. MANBECK, JR.

*Attesting Officer*   *Commissioner of Patents and Trademarks*